United States Patent [19]

Boles

[11] Patent Number: 4,960,274

[45] Date of Patent: Oct. 2, 1990

[54] MAZE TYPE DEVICE WITH OPTICAL COMPONENT

[76] Inventor: Shawn M. Boles, 105 N. Adams, Eugene, Oreg. 97402

[21] Appl. No.: 405,654

[22] Filed: Sep. 11, 1989

[51] Int. Cl.$^5$ ............................................. A63J 11/00
[52] U.S. Cl. .................................. 272/8 M; 272/8 R; 272/8 N; 272/19; 273/113; 273/153 R
[58] Field of Search ............... 272/8 R, 8 M, 8 N, 19, 272/27 R, 27 N; 273/113, 115, 153 R, 157 R; 446/131

[56] References Cited

U.S. PATENT DOCUMENTS

| | | | |
|---|---|---|---|
| 3,827,694 | 8/1974 | Lemelson | 273/113 |
| 4,023,794 | 5/1977 | Adams | 272/8 M |
| 4,259,808 | 4/1981 | Oakes | 446/131 |
| 4,776,118 | 10/1988 | Mizuno | 272/8 M X |
| 4,854,591 | 8/1989 | Setteducati | 273/157 R |

FOREIGN PATENT DOCUMENTS 428159  5/1935  United Kingdom ............... 272/8 M

Primary Examiner—Richard E. Chilcot, Jr.
Attorney, Agent, or Firm—James D. Givnan, Jr.

[57] ABSTRACT

A maze in a housing having a reflector which reflects light waves through ninety degrees to render the illusion of a ball element floating in opposition to gravity. The maze may be in a module enabling an array of maze modules to be used in conjunction with a single housing. Maze walls may be of flexible material for manual distortion for ball guidance during maze use. A mechanical actuator on the maze propels a movable member.

10 Claims, 1 Drawing Sheet

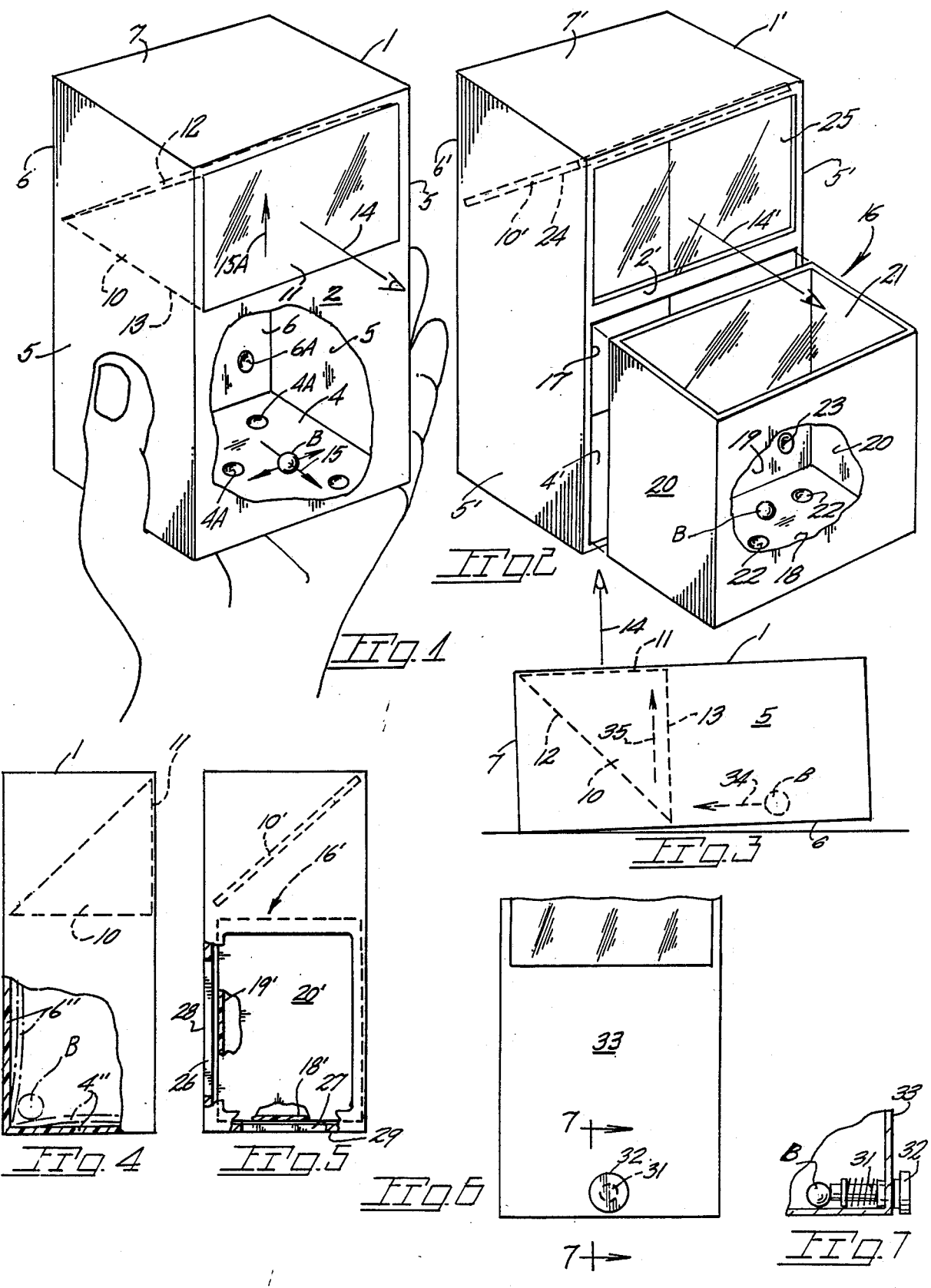

MAZE TYPE DEVICE WITH OPTICAL COMPONENT

BACKGROUND OF THE INVENTION

The present invention pertains generally to entertainment and educational devices of the maze type. In the marketplace are a wide variety of maze devices which include one or more movable members with the objective being the positioning of the member or members to a specific location in the maze. Typically ball elements are utilized in mazes which traverse a maze surface manually tilted by the user. Desired positioning of the ball element or elements is determined by hand/eye coordination of the user and determined by the user's skill. Other known maze devices incorporate metallic elements such as rings positionable by a handheld magnet. A viewing port is provided in the maze disclosed in U.S. Pat. No. 4,259,808.

SUMMARY OF THE PRESENT INVENTION

The present invention is embodied within a maze type device having an optical member to provide the illusion of one or more movable elements of the maze defying gravity.

A housing of the present device is of a size for convenient holding and/or manipulating by the user and includes an optical member for angularly diverting light rays. A movable component or components are supported by an interior surface of the maze and, by reason of the optical member, appear to move in opposition to gravity. Further, as the direction of movement of the movable element is not obvious from viewing the device, it imposes on the user the burden of calculating the way the member will move in response to certain tilting of a maze surface. In the preferred form of the present maze, multiple inner wall surfaces may support the movable element or elements permitting use of the maze in upright and horizontal positions. A prism may be utilized or a mirror, inclined to the line of site, to deflect light rays. For the purpose of providing different types of mazes, a modified form of the invention includes a housing defining an open area for the insertion of a maze module. Accordingly, a number of interchangeable maze modules may be utilized to further enhance maze appeal. Still further, the maze housing may be formed with a flexible wall member to permit influencing the direction of ball travel by manual flexure of the wall member. A still further modified form of the present invention includes mechanical means for imparting travel to a movable member of the maze.

Important objectives of the present invention include a maze type device including an optical component to provide the illusion of the movable member of the maze moving in opposition to gravity; the provision of a maze type article having multiple interior surfaces both of which constitute maze surfaces for one or more movable members of the maze; the provision of a maze device which permits the substitution of mazes of different designs in a maze housing; the provision of a maze type article having a flexible wall member and open areas to permit manual deforming of the wall members to influence travel of a movable maze member.

BRIEF DESCRIPTION OF THE DRAWINGS

In the accompanying drawings:

FIG. 1 is a perspective view of the present maze type device;

FIG. 2 is a similar view of a modified form of the device;

FIG. 3 is a side elevational view of the device operatively disposed on a horizontal surface;

FIG. 4 is a side elevational view of the device shown in FIG. 1 with a wall fragment broken away;

FIG. 5 is a side elevational view of the modified form of the device shown in FIG. 2;

FIG. 6 is a fragmentary front elevational view of a modified form of the device; and FIG. 7 is a vertical sectional view taken along line 7—7 of FIG. 6.

DETAILED DESCRIPTION OF THE PREFERRED EMBODIMENTS

With continuing attention to the drawings wherein applied reference numerals indicate parts similarly hereinafter identified, the reference numeral 1 indicates a housing of the present device which may be of a size for holding in a user's hand.

The housing includes a front wall 2, bottom wall 4, side walls 5, a rear wall 6 and a top wall 7. One or more of the walls are preferably translucent for illumination of the housing interior.

A prism 10 constitutes reflector means suitably mounted within the upper portion of the housing with a prism frontal face being at 11. Prism face 12 is disposed so as to reflect light toward the viewer along an axis or line of sight 14. A lowermost prism face 13 closes the maze area of the housing.

Bottom wall 4 of the housing constitutes a maze component and is contoured or otherwise adapted as for example with recesses or other surface irregularities at 4A to embody the particular maze desired. Typically mazes used for entertainment purposes include one or more movable elements, such as a ball B, which in response to gravity transverses a maze surface such as wall 4. Rear wall 6 may also be recessed at 6A to permit maze use in both upright and horizontal positions. In use of the FIG. 1 maze, ball travel per arrow 15 results in the illusion of the ball moving or floating upwardly per arrow 15A.

A modified form of the present maze device is shown in FIG. 2 wherein a maze module, indicated generally at 16, is insertable in a snug manner into the housing at 1' by reason of a housing front wall 2' defining an opening 17. Prime reference numerals indicate parts of the housing of the modified form corresponding to parts earlier identified with like base reference numerals. With attention to module 16, the same includes a module bottom wall 18, a rear wall 19, side walls 20 one or more of which may be translucent and a transparent closure or top wall 21. The module bottom and rear walls 18 and 19 constitute components of a maze with recesses 22 and 23 formed therein. Again mazes for entertainment purposes may take a wide range of forms and typically include one or more movable elements such as a ball element at B for guidance into a recess or along a course.

Housing 1' is shown as including reflector means at 10' in the form of a mirror having a reflective surface 24 inclined so as to reflect light outwardly of the housing along an axis or line of sight at 14'. A window is at 25.

Housing 1, as shown in FIG. 4, may be constructed from flexible or pliant material such as a soft synthetic plastic to enable bottom wall 4' and rear wall 6' to flex or be displaced in response to fingertip pressure applied for the purpose of affecting the path of movable element B'. FIG. 5 discloses a further modified maze device with a module 16' having a flexible rear wall 19' and a flexible bottom wall 18' accessible through openings 26 and 27 in the housing rear and bottom walls 28 and 29 for the application of fingertip pressure.

In FIGS. 6 and 7, means are disclosed for imparting motion to a movable member B, such as a ball element, with said means embodied in a spring biased plunger 31 having a finger grip 32 exteriorly adjacent a front wall 33 of the housing. Obviously other mechanical arrangements may be provided for imparting movement to a movable member or members of the maze, as for example, a hand held magnet.

In FIG. 3, the maze shown in FIG. 1 has been positioned with back wall 6 in place on a supporting surface. Tipping of the maze to induce motion in ball element B per arrow 34 will cause the illusion of the ball element moving upwardly in the direction of arrow 35.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A maze device comprising,
    a housing having multiple walls including adjacent bottom and rear walls each having a maze thereon,
    a movable member within said housing for support by said adjacent bottom and rear walls,
    optical reflector means in said housing for deflecting light rays for viewing of the housing interior and said movable member in an illusory manner with substantially horizontal movement of the movable member appearing as vertical movement to the viewer.

2. The maze device claimed in claim 1 additionally including a module, said movable member within said module, said adjacent bottom and rear walls in said module.

3. The maze device claimed in claim 2 wherein said module includes a window.

4. The maze device claimed in claim 1 wherein said housing includes flexible walls to permit wall flexure by fingertip pressure for purposes of guiding said movable member.

5. The maze device claimed in claim 2 wherein said module includes flexible walls to permit wall flexure by fingertip pressure for purposes of guiding said movable member.

6. The maze device claimed in claim 5 wherein said housing defines openings providing fingertip access to the module.

7. The maze device claimed in claim 1 wherein said optical reflector means is a prism.

8. The maze device claimed in claim 1 wherein said optical reflector means is a mirror.

9. The maze device claimed in claim 1 additionally includes a mechanical actuator for propelling said movable means.

10. The maze device claimed in claim 9 wherein said actuator is a spring biased plunger.

* * * * *